United States Patent
Yen et al.

(10) Patent No.: US 10,759,954 B2
(45) Date of Patent: Sep. 1, 2020

(54) AQUEOUS PIGMENT CO-DISPERSIONS

(71) Applicant: Hewlett-Packard Development Company, L.P., Fort Collins, CO (US)

(72) Inventors: Max Yen, San Diego, CA (US); David Michael Ingle, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 598 days.

(21) Appl. No.: 15/540,952

(22) PCT Filed: Jan. 30, 2015

(86) PCT No.: PCT/US2015/013713
§ 371 (c)(1),
(2) Date: Jun. 29, 2017

(87) PCT Pub. No.: WO2016/122574
PCT Pub. Date: Aug. 4, 2016

(65) Prior Publication Data
US 2018/0086928 A1    Mar. 29, 2018

(51) Int. Cl.
| | | |
|---|---|---|
| C09D 11/00 | (2014.01) | |
| C09D 11/322 | (2014.01) | |
| C09D 11/326 | (2014.01) | |
| C09B 48/00 | (2006.01) | |
| C09B 67/46 | (2006.01) | |
| C09B 67/42 | (2006.01) | |
| C09B 67/00 | (2006.01) | |

(Continued)

(52) U.S. Cl.
CPC ............ *C09D 11/322* (2013.01); *C09B 48/00* (2013.01); *C09B 67/009* (2013.01); *C09B 67/0092* (2013.01); *C09B 68/41* (2013.01); *C09D 11/326* (2013.01); *C09D 11/328* (2013.01); *C09D 11/38* (2013.01)

(58) Field of Classification Search
USPC ............ 106/31.01, 31.13, 31.6, 31.75, 31.76
See application file for complete search history.

(56) References Cited

U.S. PATENT DOCUMENTS

| | | |
|---|---|---|
| 5,334,727 A | 8/1994 | Campbell |
| 5,922,118 A | 7/1999 | Johnson et al. |

(Continued)

FOREIGN PATENT DOCUMENTS

| | | |
|---|---|---|
| EP | 1650272 | 4/2006 |
| EP | 1960475 | 8/2008 |

(Continued)

OTHER PUBLICATIONS

International Search Report and Written Opinion dated Aug. 17, 2015 for PCT/US2015/013713, Applicant Hewlett-Packard Development Company, L.P.

(Continued)

*Primary Examiner* — James E McDonough
(74) *Attorney, Agent, or Firm* — Thorpe North & Western LLP (57) ABSTRACT

The present disclosure is drawn to aqueous pigment co-dispersions. The co-dispersions include self-dispersed pigment with a chemically modified surface; released surface moieties from the self-dispersing pigment; pigment powder having the released surface moieties associated with pigment powder surfaces; polymeric dispersant; and water.

19 Claims, 6 Drawing Sheets

(51) Int. Cl.
  *C09D 11/328* (2014.01)
  *C09D 11/38* (2014.01)
  *C09D 1/00* (2006.01)
  *C09D 4/00* (2006.01)
  *C09D 5/00* (2006.01)
  *C09D 13/00* (2006.01)
  *C09K 3/00* (2006.01)

(56) References Cited

U.S. PATENT DOCUMENTS

| | | | |
|---|---|---|---|
| 6,132,501 | A | 10/2000 | Scaringe et al. |
| 6,398,858 | B1 | 6/2002 | Yu et al. |
| 6,494,943 | B1 | 12/2002 | Yu et al. |
| 7,147,696 | B2 | 12/2006 | Aoyama et al. |
| 2003/0019398 | A1 | 1/2003 | Komatsu et al. |
| 2003/0112305 | A1 | 6/2003 | Kato et al. |
| 2004/0127619 | A1 | 7/2004 | Sun et al. |
| 2005/0166798 | A1* | 8/2005 | Babler ............... C09B 67/0022 106/413 |
| 2005/0223938 | A1* | 10/2005 | Tyvoll .................. C09D 11/324 106/31.6 |
| 2005/0284329 | A1 | 12/2005 | Jackson et al. |
| 2006/0241209 | A1* | 10/2006 | Madle ................... C09D 11/40 523/160 |
| 2007/0115325 | A1 | 5/2007 | Tsubaki |
| 2007/0126831 | A1* | 6/2007 | Suzuki .................. C08F 220/30 347/100 |
| 2007/0144399 | A1 | 6/2007 | Nagashima et al. |
| 2007/0179214 | A1 | 8/2007 | Shakhnovich et al. |
| 2008/0036838 | A1 | 2/2008 | Kim et al. |
| 2009/0050014 | A1 | 2/2009 | Sujeeth et al. |
| 2010/0277548 | A1 | 11/2010 | Hakiri et al. |
| 2011/0030580 | A1 | 2/2011 | Jackson et al. |
| 2011/0234722 | A1 | 9/2011 | Vasudevan |
| 2012/0092598 | A1 | 4/2012 | Kyrlidis et al. |
| 2013/0210992 | A1 | 8/2013 | Otley et al. |

FOREIGN PATENT DOCUMENTS

| | | | |
|---|---|---|---|
| JP | 2004143271 | | 5/2004 |
| JP | 2006008911 | | 1/2006 |
| JP | 2006206626 | | 8/2006 |
| JP | 2006206626 A | * | 8/2006 |
| WO | 2015112129 | | 7/2015 |

OTHER PUBLICATIONS

Shakhnovich, Dispersant chemistry gives up its secrets, Vincentz Network, European Coatings Journal, 2006, 11 pages.

* cited by examiner

AQUEOUS PIGMENT CO-DISPERSIONS

BACKGROUND

Aqueous based pigment dispersions are used to provide coloration in a variety of areas, including inkjet printing. In order to be formulated into inkjet inks, pigment dispersions are typically of small particle size, colloidally stable, and be capable of being dispersed in an aqueous vehicle. However, a variety of colored pigments are difficult to disperse and stabilize in water-based vehicles due to the nature of the surface of the pigment and the self-assembling behavior of the pigment. Good dispersions are stable to both heat and age. In contrast, poor dispersions can cause pigment agglomeration, which alters ink viscosity, image quality, and can clog the microscopic nozzles of an inkjet print head. Thus, finding specific formulations of pigment dispersions that can be incorporated into an ink, perform well in printer devices as well as on print media, and are heat stable would be an advancement in the art.

DETAILED DESCRIPTION

Before the present disclosure is described, it is to be understood that this disclosure is not limited to the particular process steps and materials disclosed herein because such process steps and materials can vary. It is also to be understood that the terminology used herein is used for the purpose of describing particular examples only. The terms are not intended to be limiting because the scope of the present disclosure is intended to be limited only by the appended claims and equivalents thereof.

Certain pigments are difficult to disperse and often exhibit stability problems when formulated into aqueous inks, especially when exposed to heat. This creates an issue in transporting and storing inks. While some additives can be co-dispersed with inks to enhance their stability; these additives do not always yield the desired stability levels for a long enough period, or for a specific desired colorant. The pigment co-dispersion described herein solves certain problems that occur with hard to disperse pigments that are difficult stabilize.

The present disclosure is drawn to pigment co-dispersions that can be heat stable, have improved color properties, and/or improved dispersibility. For example, a pigment co-dispersion can include, self-dispersed pigment with a chemically modified surface; released surface moieties from the self-dispersing pigment; pigment powder having the released surface moieties associated with pigment powder surfaces; polymeric dispersant; and water. In various examples, a solvent can be incorporated into the co-dispersion.

In another example, a method for preparing a heat stable pigment co-dispersion is presented. The method includes milling a self-dispersing pigment having a chemically modified surface, a pigment powder, a polymeric dispersant, and water. During the milling process a portion of a surface of the self-dispersing pigment is broken away or otherwise released from the self-dispersing pigment and is transferred through chemical affinity to the pigment powder, creating a new pigment mixture with enhanced storage life. In order for the transfer of the surface to break away or transfer to the pigment powder, the milling process that is carried out is vigorous. A bead milling device, among other vigorous milling devices, is an example of a milling device that can be configured to achieve this result. In one example, the milling can be carried out at a setting of about 3500 rpms in two separate bead mills for a period of 90 minutes or greater, for example.

In yet another example, an ink can be prepared. The ink can include the pigment co-dispersion described above in a liquid vehicle. The liquid vehicle can include polymer, co-solvent and surfactant. When tested after being placed in accelerated conditions (60° C. for 4 weeks) the ink composition still has a viscosity of less than 7 cps. This indicates that the co-dispersed pigment is remaining primarily suspended.

Referring now more specifically to the pigment co-dispersion, the self-dispersing pigment that is used can be a chemically modified pigment that is also self-dispersing pigment. In one example, the pigment can be an azo modified pigment dispersion. In another example, the self-dispersing pigment is a quinacridone chemically modified using a benzenesulfonic acid (5, 7, 12, 14-tetrahydro-2, 9-dimethyl-7, 14-dioxoquinol [2, 3-b]acridinyl) sodium salt. Others can include magentas modified with benzenecarboxylic acid, isophthalic acid, or benzenephosphonic acid. Self-dispensing pigments modified with these acids are available from Cabot.

The powdered pigment can be any pigment powder. The pigment powder and the self-dispersing pigment can be different colors or the same. The particular pigment used will depend on the colorists desires in creating the composition. The co-dispersion can appear in various arrangements. In one specific example, the self-dispersing pigment and the pigment powder are homologous. For example, a chemically modified quinacridone pigment can be combined with a magenta pigment powder. Examples of such magenta pigment powders include C.I. Pigment Red 122, 192, 202, 207, 209 and 282, and mixed crystals of quinacridone pigments.

As before, while magenta is specifically exemplified the pigment powder in the co-dispersion can any colored pigment powder.

It is noted that while a magenta co-dispersed pigment is exemplified primarily herein; this is merely for purposes of describing one possible color arrangement. This specific color arrangement can be modified merely by modifying the colored pigments selected, e.g., Cabojet 200, 300 black self dispersing pigment with a carbon black powder, Cabojet 250C, cyan self dispersing pigment with a cyan powder, Cabojet 470Y yellow self dispersing pigment with a yellow powder.

The self-dispersing pigment and the pigment powder can appear in the co-dispersion at a variety of concentrations and ratios. In one example, the self-dispersing pigment can be present in the co-dispersion from about 0.5 wt % to about 80 wt % of the total co-dispersion. In another example, the self-dispersing pigment can be present from about 25 wt % to about 80 wt %. In yet another example, the self-dispersing pigment can be present in the co-dispersion from about 15 wt % to about 50 wt %. In any of the above examples, the pigment powder can be present in the co-dispersion from about 5 wt % to about 90 wt %. In one example, the pigment powder can be present at about 5 wt % to about 25 wt % of the total co-dispersion. In another example, the pigment powder can be present at about 15 wt % of the total co-dispersion. These weight percentages relate to the initial co-dispersion that is prepared. When the co-dispersion is added to liquid vehicle or ink vehicle components to form a more usable fluid, e.g., inkjet ink, colored coating composition, etc., the weight percentages will decrease, depending on how much liquid vehicle and other components are added. That being stated, the ratio of self dispersing pigment to pigment powder can remain constant, regardless of liquid component (unless additional pigment of one type or another is added at a subsequent step). With respect to the co-dispersed pigment per se, in one example, the weight ratio of the self-dispersing pigment to the pigment powder can be from 20:1 to 1:2, from 20:1 to 1:1, from 10:1 to 2:1, from 6:1 to 4:1, or from 5:1. In yet another example, the ratio of the self-dispersing pigment to the pigment powder can be from 10:1 to 1:2, from 6:1 to 1:1, from 5:1 to 1:1, from 4:1 to 1:1, or from 2:1.

Pigment colorants can include cyan, magenta, yellow, black, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 209, Pigment Violet 19, and Pigment Violet 42. Representative examples of anthraquinones include Pigment Red 43, Pigment Red 194, Pigment Red 177, Pigment Red 216, and Pigment Red 226. Representative examples of perylenes include Pigment Red 123, Pigment Red 190, Pigment Red 189, and Pigment Red 224. Representative examples of thioindigoids include Pigment Red 86, Pigment Red 87, Pigment Red 198, Pigment Violet 36, and Pigment Violet 38. Representative examples of heterocyclic yellows include Pigment Yellow 1, Pigment Yellow 12, Pigment Yellow 13, Pigment Yellow 14, Pigment Yellow 17, Pigment Yellow 73, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in powder, press cake, or dispersion form from a number of sources.

The pigments of the present disclosure can be from about 5 nm to about 10 μm; in another example, the pigments can be from 10 nm to about 500 nm in size, although sizes outside this range can be used if the pigment can remain dispersed and provide adequate printing properties.

The polymeric dispersant used in the co-dispersion can be any suitable polymeric dispersant known in the art that is sufficient to form an attraction with the pigment particles. The particular polymeric dispersant used in the co-dispersion will vary based on the pigment used in the co-dispersion; however, some suitable examples include styrene/acrylic copolymers, acrylic polymers, polyvinyl pyrrolidone resins, octylphenol ethoxylates, acetylenics, phosphate esters, and sulfonates. In one example, the polymeric dispersant is an aqueous solution of styrene-acrylic polymer having a reported acid number from 50 to 300 and/or a weight average molecular weight (Mw) from 4,000 Mw to 20,000 Mw. In another example, the polymeric dispersant can be present in the co-dispersion from about 1 wt % to about 50 wt %. In another example, the polymeric dispersant can be present at about 10 wt % to 20 wt % of the co-dispersion.

The co-dispersion can also include water. The water can be deionized. The water can be present in the co-dispersion from about 5 wt % to about 90 wt %. In one example, the water can be present in the co-dispersion from about 35 wt % to about 65 wt % of the total co-dispersion.

The pigment powder and the released surface moieties from the self-dispersing pigment can appear in the co-dispersion as individual components merely suspended in the co-dispersion and/or as conglomerate particles. In one example, the conglomerate can include a powdered pigment with the released surface moieties from the self-dispersing pigment adhered to the surface of the pigment powder. In one example, the released surface moieties can be adsorbed onto the surface of the pigment powder. The affinity of the powdered pigment to the released surface moieties increases when the pigment powder and the self-dispersing pigment are homologous. The term "homologous" can be defined as pigments in the same class of colors that would have similar surface charges and/or structures. Homologous pigments are pigment families with a common core pigment structure that does not vary in number and connectivity of aromatic rings and heteroatoms. This core structure is what imparts the self-assembling behavior of many pigments (e.g. aromatic stacking, hydrogen bonding) that are challenging to stabilize. Through the use of homology-driven affinity, an effective surface modifier could attach to a pigment face and improve its surface character towards stable dispersability. However, homologous pigments are not required. Some non-homologous pigments can act as effective stabilizers (e.g. Pigment red 254 and others in the DPP class can co-crystallize with quinacridone derivatives).

The co-dispersion can optionally include a solvent. The solvent can be any solvent that is compatible with the components in the co-dispersion. If solvent is added to prepare the dispersion, that solvent can be considered when formulating the pigment co-dispersion into a subsequent ink or coating composition. Examples of suitable classes of solvents include polar solvents, such as amides, esters, ketones, lactones, and ethers. In additional detail, co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, N-methylpyrrolidone (NMP), dimethyl sulfoxide, sulfolane, glycol ethers, alkyldiols such as 1,2-hexanediol, ethoxylated glycerols such as LEG-1, etc. In one example, the solvent is MP Diol. The solvent can be present in the co-dispersion from 0 wt % to about 20 wt % of the total co-dispersion. In yet another example, the solvent can be present in the co-dispersion at about 5 wt %.

Also presented is a method for preparing an aqueous pigment co-dispersion. The method includes admixing a self-dispersing pigment with a chemically modified surface, a pigment powder, a polymeric dispersant, and water to generate an admixture. The method can also include milling the admixture to generate released surface moieties from a surface of the self-dispersing pigment. The released surface moieties thus can transfer and adhere to the pigment powder and assist in dispersing the pigment powder. More specifically, a portion of the released portion of the self-dispersed pigment can be transferred to and adhered to the pigment powder, creating a conglomerate or composite of pigment powder with the released portion of the self-dispersing powder. The adhesion of the released portion of the self-dispersed pigment to the pigment powder can assist in dispersing the pigment powder. In one example, a solvent can be added to the admixture before milling, but this is not required.

The milling process is carried out by some mechanical shear energy with or without the aid of milling media, such as zirconia or stainless steel balls. The grinding apparatus which can provide suitable mechanical shear energy include any of the conventional grinding equipment, including bead mills, ball mills, paint shakers, Sweeco mills, attritors, sand mills, small media mills, homogenizers, micro-fluidizers, etc. The suitable grinding/milling media can include table salt, glass beads, zirconia beads, ceramic beads, plastic beads, stainless steel beads, and the like. In one example, the milling occurs using a bead mill. In another example, a horizontal bead mill can be used with 0.6 mm Yttrium-Zirconium beads to mill the admixture for 60 minutes or more. In a further example, a first bead milling cycle can be followed by an additional milling cycle of 90 minutes or more using 0.2 mm Yttrium-Zirconium beads. Essentially, the goal is to provide a vigorous enough of a milling process sufficient to cause surface moieties from the self dispersing pigment to become dislodged and adhered to the pigment powder.

Additionally, an ink composition can include the co-dispersion from above, latex polymer, and a liquid vehicle including co-solvent and surfactant (water can also be added, and/or water from the co-dispersion can be included in the ink composition). In one specific example, the ink composition can include the pigment co-dispersion, a wax dispersion, 2-pyrrolidone, MP Diol (2-methyl-1,3-propanediol), latex polymers, surfactant, chelating agent, and water.

The co-dispersion can be present in the ink composition from about 15 wt % to about 75 wt % of the total ink composition. In one embodiment the co-dispersion is present from about 20 wt % to about 30 wt % of the total ink composition. The co-dispersion can be present in the form of any of the mentioned embodiments herein. In other examples, the pigment can be present in the ink by solids content ranging from 1 wt % to 10 wt %, regardless of the liquid content of the co-dispersion used during preparation of the pigment conglomorate.

The water in the ink composition can be used to make up the balance of the composition and can make up a large portion of the liquid vehicle. In some examples, water can be present in an amount representing from about 20 wt % to about 90 wt %, or can be present in an amount representing from about 30 wt % to about 80 wt % of the total composition. In order to prevent the clogging of inkjet tip by dissolved salts in the water, deionized water can be used in the preparation of the ink composition.

General ink vehicle formulations can further include one or more additional solvents. Examples of suitable classes of solvents include polar solvents, such as amides, esters, ketones, lactones, and ethers. In additional detail, co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. More specific examples of organic solvents can include 2-pyrrolidone, N-methylpyrrolidone (NMP), dimethyl sulfoxide, sulfolane, glycol ethers, alkyldiols such as 1,2-hexanediol, ethoxylated glycerols such as LEG-1, etc. In one example the solvent is MP Diol.

Polymers, such as latex polymers, can be used included in the ink composition. In one example, the polymers present in the ink composition include a styrene acrylic emulsion polymer and an acrylic acid polymer. The polymers can be used to enhance rub or scratch durability of printed feature, or to provide binding properties. The amount of soluble polymer added can be substantially less than the amount that would be otherwise used in similar ink composition without the surface modified self-dispersing pigment.

Surfactants can also be used and can include water-soluble surfactants, such as alkyl polyethylene oxides, alkyl phenyl polyethylene oxides, polyethylene oxide (PEO) block copolymers, acetylenic PEO, PEO esters, PEO amines, PEO amides, dimethicone copolyols, ethoxylated surfactants, alcohol ethoxylated surfactants, fluorosurfactants, and mixtures thereof. In some examples, fluorosurfactants and alcohol ethoxylated surfactants can be used as surfactants. The surfactant or combinations of surfactants can be present at from about 0.001 wt % to about 10 wt % and, in some examples, can be present at from about 0.001 wt % to about 5 wt % of the ink compositions.

The ink composition described herein exhibit heat stability and long term storage stability while maintaining a useable viscosity. As shown in the Examples below, the ink compositions exemplified exhibited less than a 2 fold increase in viscosity under accelerated testing conditions (60° C. for 4 weeks), whereas control formulations had over a 2 fold increase in viscosity during the testing period under the same testing conditions. Additionally, the ink compositions exemplified exhibited less of an increase in average particle size when tested under accelerated testing conditions (60° C. for 4 weeks) than control formulations without a dispersant. The average particle size in the vast majority of the exemplified formulations exhibited less than 1 and ½ size increase in average particle size (based on pigment solid content agglomeration), whereas the control formulations exhibited over an 1 and ½ times increase to nearly a two time increase in average particle size (based on pigment solid content agglomeration).

Consistent with the formulations of this disclosure, various other additives can be employed to optimize the properties of the ink composition for specific applications. Examples of these additives are those added to inhibit the growth of harmful microorganisms. These additives can be biocides, fungicides, and other microbial agents, which are routinely used in ink formulations. Examples of suitable microbial agents include, but are not limited to, Nuosept® (Nudex, Inc.), Ucarcide® (Union carbide Corp.), Vancide® (R.T. Vanderbilt Co.), Proxel® (ICI America), and combinations thereof. Sequestering agents such as EDTA (ethylene diamine tetra acetic acid) can be included to eliminate the deleterious effects of heavy metal impurities, and buffer solutions can be used to control the pH of the ink. Viscosity modifiers and buffers can also be present, as well as other additives known to those skilled in the art to modify properties of the ink as desired.

The ink compositions described above can be suitable for use on any type of substrate of print media. Suitable examples include, but are not limited to include, cellulose based paper, fiber based paper, other paper media, nonporous media, swellable media, microporous media, photobase media, offset media, coated media, uncoated media, and other types of media. Other types of media can include plastics, vinyl, fabrics, and woven substrate.

It is noted that, as used in this specification and the appended claims, the singular forms "a," "an," and "the" include plural referents unless the content clearly dictates otherwise.

As used herein, the term "dispersant" means a surface active agent added to a suspending medium to promote uniform and maximum separation of extremely fine solid particles often of colloidal size. For pigments, dispersants are most often polymeric dispersant.

"Self-dispersed pigment" or "self-dispersing pigment" refers to pigment particles whose surface has been chemically modified with dispersibility-imparting groups that allow stable dispersion in an aqueous vehicle without a separate dispersant. In one example the dispersibility-imparting group is a benzene sulphonic acid. The terms "self-dispersed pigment" or "self-dispersing pigment" can be used interchangeably to refer to pigment particles with a chemically modified surface.

"Substrate," "media," "medium," or "media substrate" includes any base material that can be coated in accordance with the present disclosure. Further, pre-coated and film coated substrates can be considered a "substrate" that can be further coated in accordance with the present disclosure.

As used herein, the term "about" is used to provide flexibility to a numerical range endpoint by providing that a given value can be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data can be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate embodiments of the disclosure. However, it is to be understood that the following are only exemplary or illustrative of the application of the principles of the presented formulations. Numerous modifications and alternative methods can be devised by those skilled in the art without departing from the spirit and scope of the present disclosure. The appended claims are intended to cover such modifications and arrangements. Thus, while the examples have been described above with particularity, the following provide further detail in connection with what are presently deemed to be the acceptable examples.

Example 1—Preparation of Dispersions C1, C2 and F1-F4

Several pigment dispersion formulations were prepared according to examples of the present disclosure using the compositional components set forth in Table 1 below. Control 1 includes the powdered pigment in base dispersant ingredients. Control 2 includes the powder pigment with a dispersant. Neither of the controls include a self-dispersing pigment with a chemically modified surface. In all of the formulations below, Cinquasia® Magenta D 45550 J (BASF Chemicals) and Pigment Red 122 were used as the powdered pigment. The self-dispersing pigment with a chemically modified surface was chosen from either an experimental surface modified quanicridone (Pigment 1) or Cabojet® 265 (Cabot Corporation).

TABLE 1

| | Controls/Pigment Co-Dispersions | | | | | |
|---|---|---|---|---|---|---|
| Ingredient | C1-control | C2-control | F1 | F2 | F3 | F4 |
| | Wt % | | | | | |
| Cinquasia ® Magenta D 45550 J* | 15 | 15 | 15 | 15 | 15 | 15 |
| Styrene-acrylic polymer (Mw 17,250) | 15 | 15 | 15 | 15 | 15 | 15 |
| MPDiol | 5 | 5 | 5 | 5 | 5 | 5 |
| Deionized Water | 65 | 60 | 63.5 | 55 | 35 | 35 |
| E-sperse ® 100* | — | 5 | — | — | — | — |
| Surface Modified Quinacridone (Pigment 1) | — | — | 1.5 | — | — | — |
| Cabojet ® 265M* | — | — | — | 10 | 30 | 30 |

*Cinquasia ® Magenta D 45550 J (Pigment Red 122) is available from BASF chemicals; E-sperse ® 100 is available from Ethox Chemicals; and Cabojet ® 265M available from Cabot Corporation.

Formulations C1, C2, and F1-F3 above were admixed in a high speed shearer for several minutes and co-milled using a bead mill. The bead milling was conducted in a horizontal bead mill ("Eiger 100" by Engineered Mills, Inc.) and ground with 0.6 mm Yttrium-Zirconium beads for 60 minutes followed by milling using 0.2 mm Yttrium-Zirconium beads for 90 minutes. Formulation F4 was blended by hand to show the difference vigorous milling can generate in dispersion properties.

Example 2—Preparation of Ink Formulations from Co-Dispersions C1, C2, and F1-F4

Each of the controls and formulations described above were formulated into respective ink compositions. The ink components were the same in each of the ink compositions, except for the dispersions prepared above in Example 1. The ink components are set forth in Table 2A.

TABLE 2A

Ink Components

| Components | Wt % |
|---|---|
| Pigment Co-dispersion (C1, C2, F1, F2, F3 or F4) | 27.7 |
| Styrene acrylic emulsion polymer | 16.5 |
| Wax dispersion | 4.0 |
| 2-pyrrolidone | 13.7 |
| MP Diol | 7.7 |
| Phosphate surfactant | 0.20 |
| Alkylethoxy surfactant (HLB 6-9) | 1.50 |
| C6 fluorocarbon surfactant | 2.60 |
| pH buffer | 0.10 |
| Polyacrylic acid dispersant | 0.14 |
| Water | 25.86 |

The respective inks were prepared by combining the pigment co-dispersion or control above with the ink ingredients in Table 2A. The inks were filtered using depth filters in tandem that were rated at 5 microns and 1 micron. The filters specifically used were 2 Pall Profile II inkjet filters (available from Pall Corporation).

Table 2B includes the solid content information for the pigment in the ink composition.

TABLE 2B

Pigment Amount in the Ink

| Ink ID | Wt % Solid Pigment in the Dispersing Aid or Self-Dispersing Pigment | Wt % Pigment in Co-Dispersion | Wt % Pigment in Ink |
|---|---|---|---|
| C1 - Ink | 0 | 15 | 4.155 |
| C2 - Ink | 5 | 20 | 5.540 |
| F1 - Ink | 1.5 | 16.5 | 4.570 |
| F2 - Ink | 1 | 16 | 4.432 |
| F3 - Ink | 3 | 18 | 4.986 |
| F4 - Ink | 3 | 18 | 4.986 |

Example 3—Viscosities

Each of the ink formulations prepared in Example 2 were tested for viscosity. The viscosity was measured by the Brookfield Viscolite, which operates at a high shear of 20,000 Hz. The viscosity of each ink was initially measured at a temperature of 25° C. Following this, the ink was separated into two vials. One vial was subjected to a T-cycle experiment and the viscosity was measured at 40 hours. The T-cycle experiment was carried out by heating and maintaining 5-50 grams of the ink in a small plastic container at 70° C. for 4 hours. The ink was then cooled to 40° C. and maintained at that temperature for an additional 4 hours. The heating and cooling cycle was repeated four more times. Following the fifth and final cycle, the viscosity of the ink was measured. The other vial was stored at 60° C. and the viscosity was measured at 2 weeks and at 4 weeks.

TABLE 3

Viscosities

| | Viscosity (cps) | | | |
|---|---|---|---|---|
| INK ID | 0 wk | T-cycle | 2 wk | 4 wk |
| C1 | 3.4 | 4.1 | 6.4 | 6.9 |
| C2 | 3.6 | 4.6 | 5.3 | 5.8 |
| F1 | 3.6 | 3.9 | 4.8 | 4.9 |
| F2 | 3.3 | 3.7 | 5.5 | 6.4 |
| F3 | 3.3 | 3.3 | 3.9 | 4.4 |
| F4 | 3.3 | 3.2 | 3.8 | 5.0 |

Figure 1:
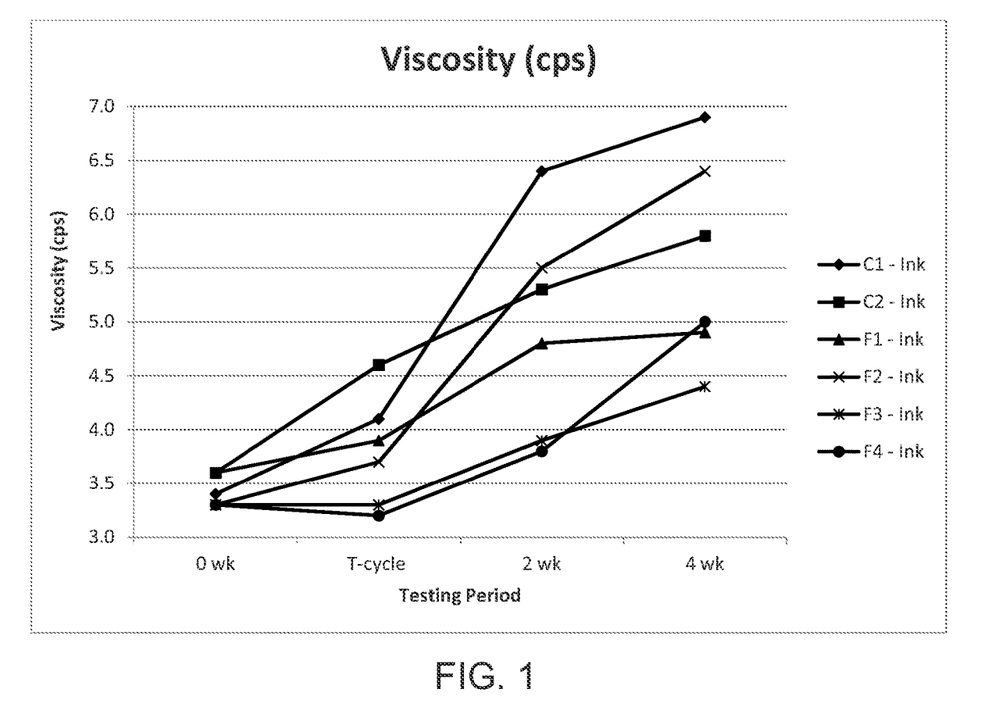
FIG. 1 is a plot of the viscosity of several formulations in accordance with the examples of the present disclosure.

The viscosity for each of these inks is plotted and shown in FIG. 1. The viscosity of the control formulations (C1—without the self-dispersing pigment and the polymeric dispersant; C2—without the self-dispersing pigment but with a polymeric dispersant) steadily increased over the storage period. The viscosity of the ink formulations F1 ink, F3 ink, and F4 ink were more stable, i.e. exhibited less thickening over time. It is noted that the F3 ink and the F4 ink are the same formulations with the exception that the pigment co-dispersion in the F3 ink was co-milled, whereas the pigment co-dispersion in the F4 ink was blended by hand. Based on this example, it is notable that co-milling enhances the stability of the formulation beyond what is achieved by hand mixing.

Example 4—Pigment Particle Size in Inks (Nanometers Mean Value)

Each of the ink formulations prepared in Example 2 were tested for average particle size using mean value. The particle size was tested using Dynamic light scattering product from Microtrac, product name Nanotrac. The particle size of each ink was initially tested. Following this, the ink was separated into two vials. One vial was subjected to a T-cycle experiment and the particle size was measured at 40 hours. The T-cycle experiment was carried out by heating and maintaining 5-50 grams of the ink in a small plastic container at 70° C. for 4 hours. The ink was then cooled to 40° C. and maintained at that temperature for an additional 4 hours. The heating and cooling cycle was repeated four more times. Following the fifth and final cycle the particle size of the pigment in the ink was measured. The other vial was stored at 60° C. and the particle size was measured at 2 weeks and at 4 weeks.

TABLE 4

Average Particle Sizes (nanometers mean value)

| | Average Particle Size (Nanometers mean value) | | | |
|---|---|---|---|---|
| INK ID | 0 wk | T-cycle | 2 wk | 4 wk |
| C1 | 223 | 243 | 330 | 370 |
| C2 | 216 | 242 | 251 | 259 |
| F1 | 216 | 229 | 246 | 261 |
| F2 | 223 | 232 | 281 | 314 |
| F3 | 218 | 223 | 241 | 259 |
| F4 | 221 | 227 | 236 | 255 |

Figure 2:
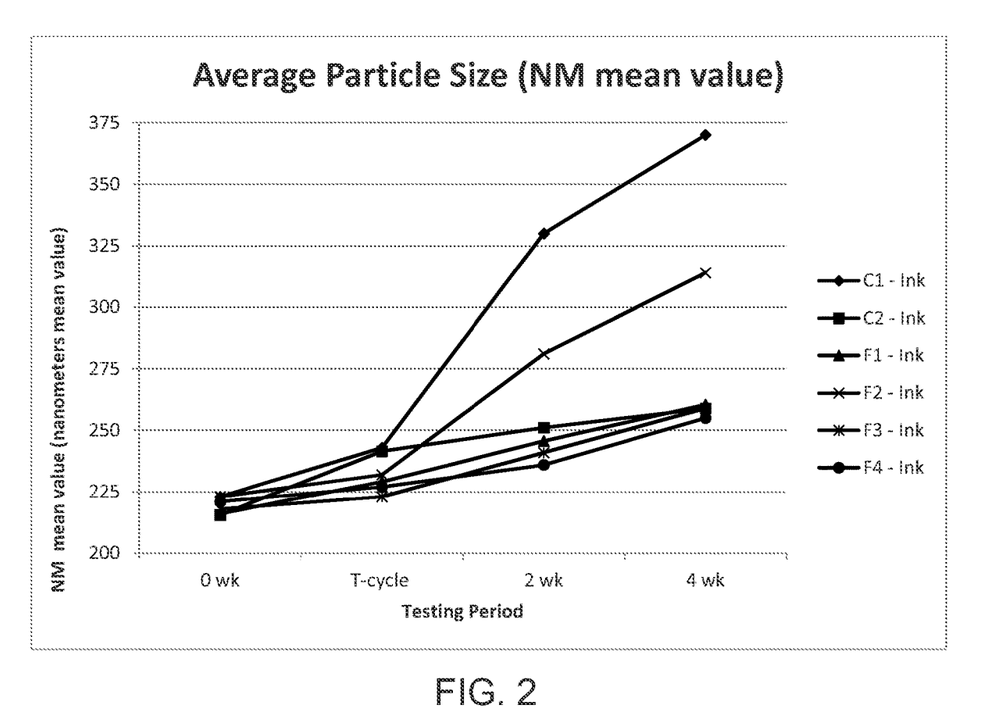
FIG. 2 is a plot of average particle size (nanometer mean value) of formulations in accordance with the examples of the present disclosure.

The average particle size for each of these inks in nanometers mean value is plotted and shown in FIG. 2. The particle size of the C1 ink (without the self-dispersing pigment and the polymeric dispersant) drastically increased over the storage period. The particle size of the ink formulations, F1, F3, and F4 and C2 (without the self-dispersing pigment but with a polymeric dispersant) were more stable and had less increase in particle size over the testing period. It is noted, that while C2 had a good particle-size, that the viscosity was bad and would affect the ink refill rate. In addition, the polymeric dispersant used in C2 has been implicated in an undesirable ink phenomenon where the ink drop velocity will diminish over a sustained firing event causing print defects.

Example 5—Pigment Particle Size in Ink (Nanometers 95%)

Each of the ink formulations prepared in Example 2 were tested for average particle size at 95%. D95% is a measure to describe the particle-size distribution as calculated by dynamic light scattering. D95% measured at 250 nm, for example, means that 95% of the particle-size distribution is at or below that number. The particle size of each ink was initially tested. Following this, the ink was separated into two vials. One vial was subjected to a T-cycle experiment and the particle size was measured at 40 hours. The T-cycle experiment was carried out by heating and maintaining 5-50 grams of the ink in a small plastic container at 70° C. for 4 hours. The ink was then cooled to 40° C. and maintained at that temperature for an additional 4 hours. The heating and cooling cycle was repeated four more times. Following the fifth and final cycle the particle size of the ink was measured. The other vial was stored at 60° C. and the particle size was measured at 2 weeks and at 4 weeks.

TABLE 5

Average Particle Sizes (nanometers 95%)

| INK ID | 0 wk | T-cycle | 2 wk | 4 wk |
|---|---|---|---|---|
| C1 | 376 | 385 | 523 | 698 |
| C2 | 347 | 363 | 385 | 416 |
| F1 | 357 | 362 | 394 | 392 |
| F2 | 345 | 383 | 424 | 533 |
| F3 | 369 | 354 | 370 | 396 |
| F4 | 349 | 354 | 379 | 386 |

Figure 3:
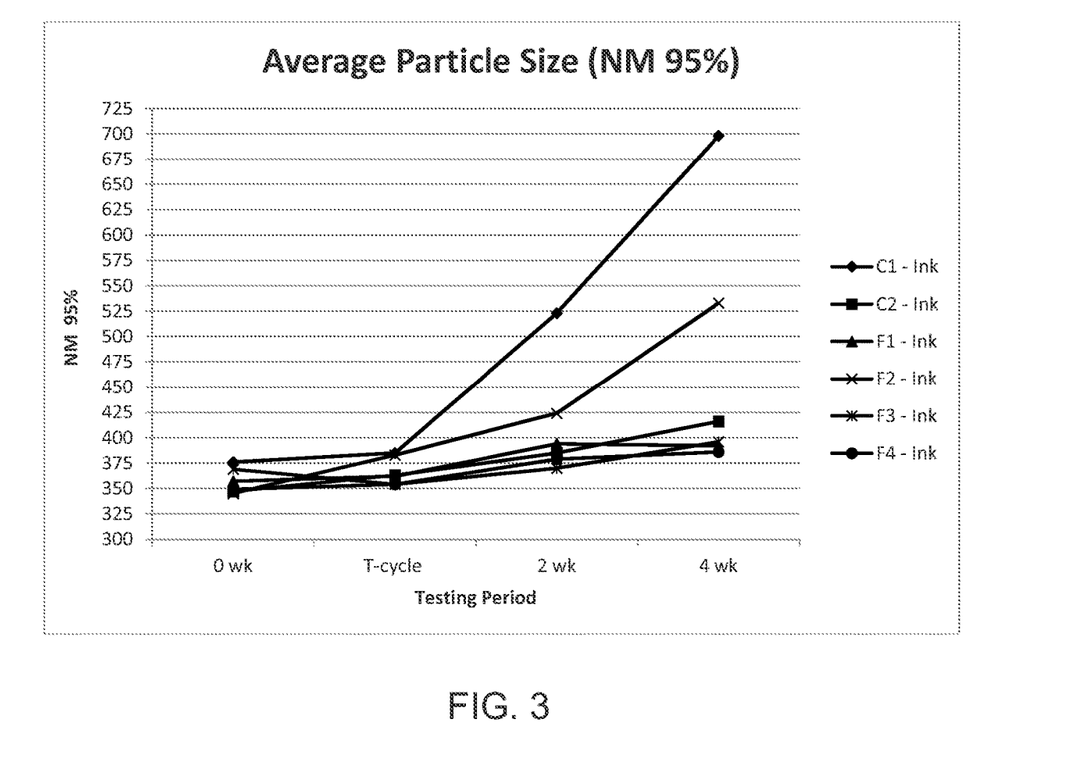
FIG. 3 is a plot of average particle size (nanometer 95%) of formulations in accordance with the examples of the present disclosure.

The average particle size for each of these inks using nanometers 95% is plotted and shown in FIG. 3. The particle size of the C1 ink (without the self-dispersing pigment and the polymeric dispersant) drastically increased over the storage period. The particle size in the ink formulations F1, F3, and F4 and C2 (without the self-dispersing pigment but with a polymeric dispersant) were more stable and had less increase in particle size over the testing period.

Example 6—Preparation of Dispersions C3 and F5-F9

Several pigment dispersion formulations were prepared according to examples of the present disclosure using the compositional components set forth in Table 6. The C3 dispersion includes the powdered pigment in the base dispersant ingredients. The C3 dispersion does not include a self-dispersing pigment with a chemically modified surface or a polymeric dispersant solution. In all of the formulations below, Clariant EO2 pigment (Clariant Chemicals), mixed crystal quinacridone containing PV19 and PR122, was utilized as the powdered pigment. The self-dispersing pigment with a chemically modified surface was chosen from either experimental surface modified quinacridone pigments (Pigment 2 or 3), or Cabojet® 265 (Cabot Corporation).

TABLE 6

Control/Pigment Co-Dispersions

| Ingredient | C3-control | F5 | F6 | F7 | F8 | F9 |
|---|---|---|---|---|---|---|
| | | | Wt. % | | | |
| Clariant EO2* | 15 | 15 | 15 | 15 | 15 | 15 |
| Styrene-acrylic polymer Mw 17,250 | 15 | 15 | 15 | 15 | 15 | 15 |
| MPDiol | 5 | 5 | 5 | 5 | 5 | 5 |
| Deionized Water | 65 | 64.2 | 64.2 | 55 | 35 | 35 |
| Surface Modified Quinacridone Pigment 2 | — | 0.8 | — | — | — | — |
| Surface Modified Quinacridone Pigment 3 | — | — | 0.8 | — | — | — |
| Cabojet ® 265M* | — | — | — | 10 | 30 | 30 |

*Clariant EO2 is a mixed crystal quinacridone containing PV19 and PR122, it is available from Clariant Chemicals; and Cabojet ® 265M is available from Cabot Corporation.

Formulations C3 and F5-F8 above were admixed in a high speed shearer for several minutes and co-milled using a bead mill. The bead milling was conducted in a horizontal bead mill ("Eiger 100" by Engineered Mills, Inc.) and ground with 0.6 mm Yttrium-Zirconium beads for 60 minutes followed by milling using 0.2 mm Yttrium-Zirconium beads for 90 minutes. Formulation F9 was blended by hand to show the difference vigorous milling can generate in dispersion properties.

Example 7—Preparation of Ink Formulations from Co-Dispersions C3 and F5-F9

Each of the controls and formulations described above in Example 6 were formulated into various ink compositions. The ink components were the same in each of the ink compositions, except for the co-dispersed pigments prepared as described above. The ink components are set forth in Table 7A.

TABLE 7A

Ink Components

| Components | Wt % |
|---|---|
| Pigment Co-dispersion (C3, F5, F6, F7, F8, or F9) | 27.7 |
| Styrene acrylic emulsion polymer | 16.5 |
| Wax dispersion | 4.0 |
| 2-pyrrolidone | 13.7 |
| MP Diol | 7.7 |
| Phosphate surfactant | 0.20 |
| Alkylethoxy surfactant, HLB 6-9 | 1.50 |
| C6 fluorocarbon surfactant | 2.60 |
| pH buffer | 0.10 |
| Polyacrylic acid dispersant | 0.14 |
| Water | 25.86 |

The inks were prepared by combining the pigment co-dispersion or the control above with the ink ingredients in Table 7A. The inks were filtered using depth filters in tandem that were rated at 5 microns and 1 micron. The filters specifically used were 2 Pall Profile II inkjet filters (available from Pall Corporation).

Table 7B includes the solid content information for the pigments in the ink composition.

TABLE 7B

Pigment Amount in the Ink

| Ink ID | Wt % Solid Pigment in the Dispersing Aid or Self-Dispersing Pigment | Wt % Pigment in Co-Dispersion | Wt % Pigment in Ink |
| --- | --- | --- | --- |
| C3 - Ink | 0 | 15 | 4.155 |
| F5 - Ink | 0.8 | 15.8 | 4.376 |
| F6 - Ink | 0.8 | 15.8 | 4.376 |
| F7 - Ink | 1 | 16 | 4.432 |
| F8 - Ink | 3 | 18 | 4.986 |
| F9 - Ink | 3 | 18 | 4.986 |

Example 8—Viscosities

Each of the ink formulations prepared in Example 7 were tested for viscosity. The viscosity was measured by the Brookfield Viscolite, which operates at a high shear of 20,000 Hz. The viscosity of each ink was initially tested at a temperature of 25° C. Following this, the ink was separated into two vials. One vial was subjected to a T-cycle experiment and the viscosity was measured at 40 hours. The T-cycle experiment was carried out by heating and maintaining 5-50 grams of the ink in a small plastic container at 70° C. for 4 hours. The ink was then cooled to 40° C. and maintained at that temperature for an additional 4 hours. The heating and cooling cycle was repeated four more times. Following the fifth and final cycle the viscosity of the ink was measured. The other vial was stored at 60° C. and the viscosity was measured at 2 weeks and at 4 weeks.

TABLE 8

Viscosities

| | Viscosity (cps) | | | |
| --- | --- | --- | --- | --- |
| INK ID | 0 wk | T-cycle | 2 wk | 4 wk |
| C3 | 3.6 | 5.0 | 6.0 | 6.3 |
| F5 | 4.4 | 5.2 | 5.4 | 5.4 |
| F6 | 4.4 | 5.2 | 5.5 | 5.8 |
| F7 | 3.3 | 4.8 | 5.5 | 5.2 |
| F8 | 3.2 | 3.5 | 4.7 | 4.7 |
| F9 | 3.4 | 3.9 | 5.4 | 6.0 |

Figure 4:
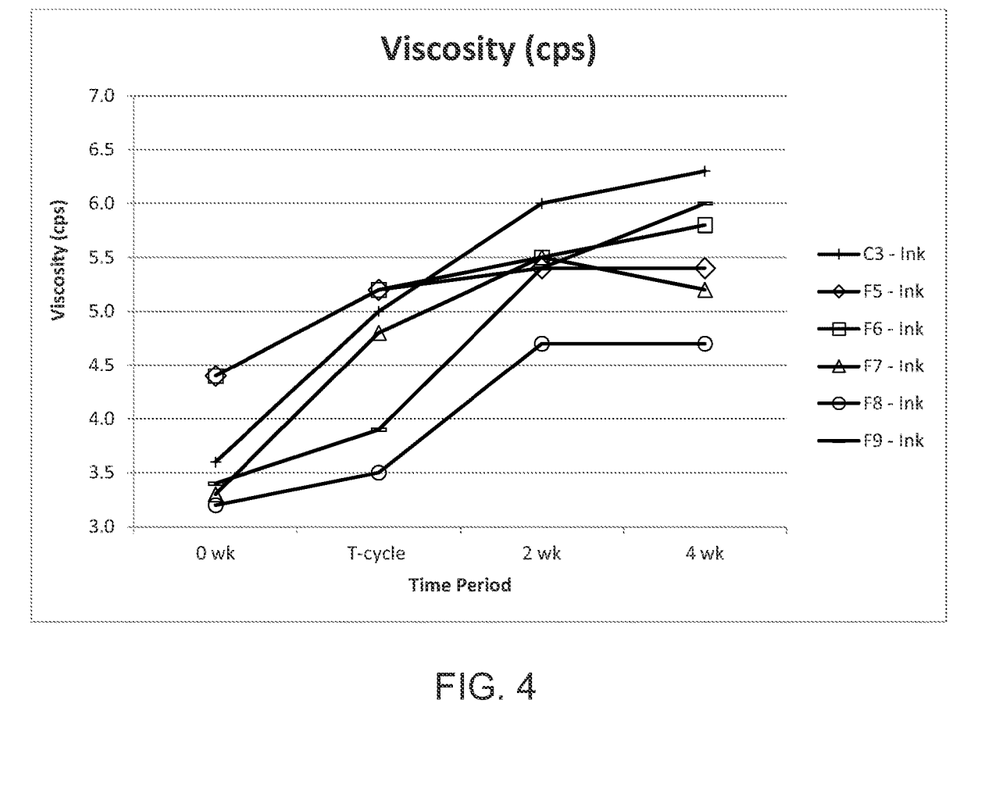
FIG. 4 is a plot of the viscosity of additional formulations in accordance with the examples of the present disclosure.

The viscosity for each of these inks is plotted and shown in FIG. 4. The viscosity of the control formulation C3 (without the self-dispersing pigment and the polymeric dispersant) steadily increased over the storage period. The viscosity of the formulations including the self-dispersing pigment that were co-milled were more stable, exhibited less thickening over time. It is noted that the F8 ink and the F9 ink are the same formulations with the exception that the pigment co-dispersion in the F8 ink was co-milled wherein the pigment co-dispersion in the F9 ink was blended by hand. Based on this example, co-milling enhances the stability of the formulation compared to hand blending.

Example 9—Pigment Particle Size in Inks (Nanometers Mean Value)

Each of the ink formulations prepared in Example 7 were tested for average particle size. The particle size was tested using Dynamic light scattering product from Microtrac, product name Nanotrac. The particle size of each ink was initially tested. Following this, the ink was separated into two vials. One vial was subjected to a T-cycle experiment and the particle size was measured at 40 hours. The T-cycle experiment was carried out by heating and maintaining 5-50 grams of the ink in a small plastic container at 70° C. for 4 hours. The ink was then cooled to 40° C. and maintained at that temperature for an additional 4 hours. The heating and cooling cycle was repeated four more times. Following the fifth and final cycle the particle size of the pigment in the ink was measured. The other vial was stored at 60° C. and the particle size was measured at 2 weeks and at 4 weeks.

TABLE 9

Average Particle Sizes (nanometers mean value)

| | Average Particle Size (Nanometers mean value) | | | |
| --- | --- | --- | --- | --- |
| INK ID | 0 wk | T-cycle | 2 wk | 4 wk |
| C3 | 237 | 271 | 306 | 351 |
| F5 | 246 | 265 | 267 | 264 |
| F6 | 248 | 278 | 265 | 287 |
| F7 | 220 | 264 | 281 | 277 |
| F8 | 224 | 239 | 260 | 269 |
| F9 | 224 | 241 | 269 | 274 |

Figure 5:
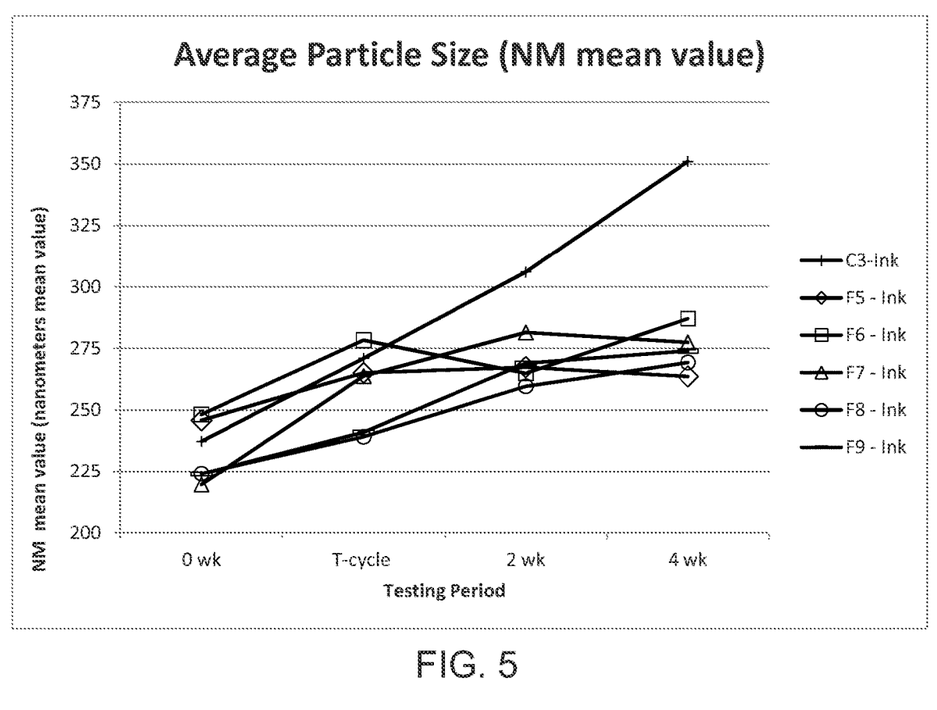
FIG. 5 is a plot of average particle size (nanometer mean value) of additional formulations in accordance with the examples of the present disclosure.

The average particle size for each of these inks in nanometers mean value is plotted and shown in FIG. 5. The particle size of the control C3 (without the self-dispersing pigment and the polymeric dispersant) drastically increased over the storage period. The particle size of the formulations with the self-dispersing pigment were more stable and had less increase in particle size over the testing period.

Example 10—Pigment Particle Size in Ink (Nanometers 95%)

Each of the ink formulations prepared above were tested for average particle size. D95% is a measure to describe the particle-size distribution as calculated by dynamic light scattering. D95% measured at 250 nm, for example, means that 95% of the particle-size distribution is at or below that number. Following this, the ink was separated into two vials. One vial was subjected to a T-cycle experiment and the particle size was measured at 40 hours. The T-cycle experiment was carried out by heating and maintaining 5-50 grams of the ink in a small plastic container at 70° C. for 4 hours. The ink was then cooled to 40° C. and maintained at that temperature for an additional 4 hours. The heating and cooling cycle was repeated four more times. Following the fifth and final cycle the particle size of the ink was measured. The other vial was stored at 60° C. and the particle size was measured at 2 weeks and at 4 weeks.

TABLE 10

Average Particle Sizes (nanometers 95%)

| | Average Particle Size (Nanometers 95%) | | | |
| --- | --- | --- | --- | --- |
| INK ID | 0 wk | T-cycle | 2 wk | 4 wk |
| C3 | 360 | 439 | 539 | 609 |
| F5 | 356 | 413 | 398 | 416 |

TABLE 10-continued

Average Particle Sizes (nanometers 95%)

| INK ID | Average Particle Size (Nanometers 95%) | | | |
|---|---|---|---|---|
| | 0 wk | T-cycle | 2 wk | 4 wk |
| F6 | 355 | 437 | 387 | 544 |
| F7 | 318 | 441 | 472 | 408 |
| F8 | 353 | 383 | 407 | 412 |
| F9 | 367 | 351 | 418 | 404 |

Figure 6:
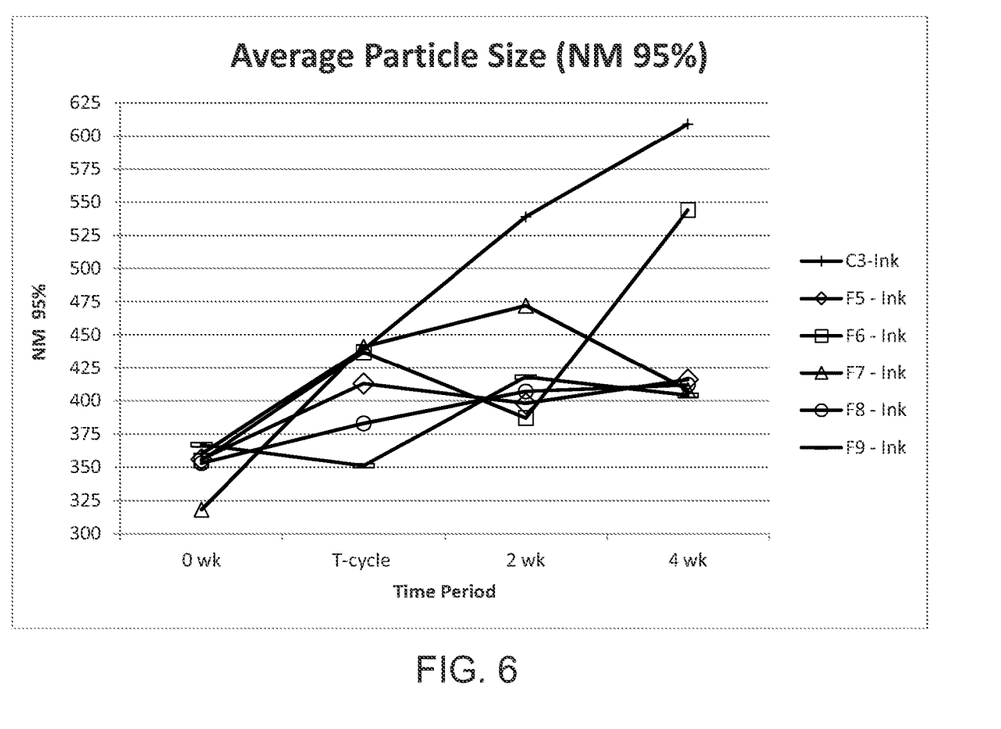
FIG. 6 is a plot of average particle size (nanometer 95%) of additional formulations in accordance with the examples of the present disclosure.

The average particle size for each of these inks in nanometers 95% is plotted and shown in FIG. 6. The particle size of the control C3 (without the self-dispersing pigment and the polymeric dispersant) drastically increased over the storage period. The particle size in the formulations including the self-dispersing pigment were more stable and had less increase in particle size over the testing period. The F6 ink exhibited the least stability out of the inks including a self-dispersing pigment. The F6 ink included the pigment 3 (an experimental quinacridone derivative prepared in-house), at 0.8 wt %.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. An aqueous pigment co-dispersion, comprising:
   self-dispersing pigment with a chemically modified surface;
   released surface moieties from the self-dispersing pigment and suspended in the co-dispersion as individual components;
   pigment powder having a portion of the released surface moieties adsorbed on or composited with surfaces of the pigment powder;
   polymeric dispersant; and
   water.

2. The aqueous pigment co-dispersion of claim 1, wherein the self-dispersing pigment is present in the co-dispersion at from 0.5 wt% to 80 wt%, and the pigment powder is present in the co-dispersion from about 5 wt% to about 90 wt%.

3. The aqueous pigment co-dispersion of claim 1, wherein the weight ratio of the self-dispersing pigment to the pigment powder is from 20:1 to 1:2 by weight.

4. The aqueous pigment co-dispersion of claim 1, wherein the weight ratio of the self-dispersing pigment to the pigment powder is from 6:1 to 1:1 by weight.

5. The aqueous pigment co-dispersion of claim 1, wherein the self-dispersing pigment and the pigment powder are homologous.

6. The aqueous pigment co-dispersion of claim 5, wherein the self-dispersing pigment is a quinacridone having the chemically modified surface, and the pigment powder is also a quinacridone.

7. A method of preparing an aqueous pigment co-dispersion, comprising:
   admixing a self-dispersing pigment with a chemically modified surface a pigment powder; a polymeric dispersant; and water to generate an admixture; and
   milling the admixture to generate released surface moieties from the chemically modified surface of the self-dispersing pigment, wherein a portion of the released surface moieties transfer and become adsorbed on or composited with surfaces of the pigment powder and assist in dispersing the pigment powder.

8. The method of claim 7, wherein the milling is bead milling for a period of 60 minutes or more.

9. The method of claim 7, further comprising adding at least one solvent to admixture prior to milling.

10. The method of claim 7, wherein the self-dispersing pigment and pigment powder are homologous.

11. A heat stable ink composition, comprising
    an aqueous pigment co-dispersion, wherein the pigment co-dispersion comprises self-dispersing pigment, released surface moieties form the self-dispersing pigment, pigment powder having a portion of the released surface moieties adsorbed on or composited with surfaces of the pigment powder, polymeric dispersant, and water;
    latex polymer; and
    a liquid vehicle comprising co-solvent and surfactant.

12. The heat stable ink composition of claim 11, having an increase in viscosity of less than 2 times the initial value after being stored at 60° C. for a period of 4 weeks.

13. The heat stable ink composition of claim 11, wherein the average particle size of dispersed pigments in the ink is less than 300 nanometers after being stored at 60° C. for a period of 4 weeks.

14. The heat stable ink composition of claim 11, wherein the pigment is present in an amount representing from about 1 wt% to about 10 wt% of the total weight of the ink composition.

15. The aqueous pigment co-dispersion of claim 1, wherein the polymeric dispersant has an acid number from 50 to 300 and a weight average molecular weight from 4,000 MW to 20,000 MW.

16. The aqueous pigment co-dispersion of claim 1, wherein the chemically modified surface of the self-dispersing pigment is modified with a benzenesulfonic acid, benzenecarboxylic acid, isophthalic acid, benzenephosphonic acid, or salt thereof.

17. The method of claim 7, wherein the chemically modified surface of the self-dispersing pigment is modified with a benzenesulfonic acid, benzenecarboxylic acid, isophthalic acid, benzenephosphonic acid, or salt thereof.

18. The heat stable ink composition of claim 11, wherein the chemically modified surface is modified with a benzenesulfonic acid, benzenecarboxylic acid, isophthalic acid, benzenephosphonic acid, or salt thereof.

19. The aqueous pigment co-dispersion of claim 1, wherein the released surface moieties are composited with the surface of the pigment powder and wherein compositing includes co-crystalization of the released surface moieties with the surface of the pigment powder.

* * * * *